(12) United States Patent
Argento

(10) Patent No.: US 6,305,630 B1
(45) Date of Patent: Oct. 23, 2001

(54) MAGNETIC TAPE HAVING HEXADECIMAL HOLE PATTERNS

(75) Inventor: Danny J. Argento, Camarillo, CA (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/408,611

(22) Filed: Sep. 30, 1999

(51) Int. Cl.⁷ .................................................. G11B 23/87
(52) U.S. Cl. .......................... 242/341; 242/338; 242/344; 360/132; 360/134
(58) Field of Search ................................. 242/344, 341, 242/348, 338, 357; 360/132, 134

(56) References Cited

U.S. PATENT DOCUMENTS 4,863,114   9/1989   Moeller et al. .
5,608,584   3/1997   Steinberg et al. .

*Primary Examiner*—John Q. Nguyen
(74) *Attorney, Agent, or Firm*—Eric D. Levinson

(57) ABSTRACT

A data cartridge includes a length of magnetic tape which is formed at one end with a first pattern of holes to enable identification of the end of the tape and a second pattern of holes located within the first pattern of holes and configured to provide a binary code to enable automatic identification of the cartridge type or tape type. The binary code provides for a least significant bit and a most significant bit in a hexadecimal configuration.

8 Claims, 2 Drawing Sheets

MAGNETIC TAPE HAVING HEXADECIMAL HOLE PATTERNS

BACKGROUND OF THE INVENTION

1. Field of the Invention

The present invention relates generally to magnetic tape cartridges in which the magnetic tape contained therein and more particularly to a tape including patterns for coding holes from which tape recorder functions may be automatically controlled.

2. Description of the Prior Art

The use of sets of holes to demark the ends of the recording area of the length of recording tape is known. U.S. Pat. No. 4,863,114 provides for a pattern of holes to identify the cartridge type or tape type.

Use of the identifications system disclosed in U.S. Pat. No. 4,863,114 has been carried out in the octal system. The least significant bit number was identified by a combination of six hole patterns. There are three groups of two, thereby representing a three digit binary number. The binary number would vary from 000 to 111 or the equivalent of from 0 to 7 in the decimal system. The most significant bit was represented by either a combination of four hole patterns or six hole patterns. The four hole patterns would designate a binary number from 00 to 11 or from 0 to 3 in the decimal system. The six digital hole pattern would designate from 000 to 111 in the binary system or from 0 to 7 in the decimal system. The number of identifications available, as shown in U.S. Pat. No. 4,863,114, were either 4×8 or 32; or 8×8 or 64. As the number of tape cartridges and type of tapes has grown, the number of available identifications still to be assigned is rapidly shrinking. In addition, the least significant bit and most significant bit were used to represent an octal number.

SUMMARY OF THE INVENTION

The present invention addresses the problems associated with the prior art cartridges and provides for a cartridge having a larger number of identification codes and for an identification code which is in the hexadecimal system for ready use by computers.

The present invention is a magnetic tape cartridge having a cartridge shell defining an enclosure. A pair of reel hubs are supported within the enclosure. A length of magnetic tape extends along a tape path within the enclosure and has its ends wound on each of the reel hubs. The length of tape being formed at each end with a pattern of holes to enable automatic identification of the ends of the tape and defined by a succession of cells each consisting of one hole at one end of the tape and a succession of cells each consisting of two or more closely associated holes arranged across the width of the tape on a line perpendicular to the length of the tape at the other end of the tape. A second pattern of holes is located between two of the successive cells of the first pattern of holes and configured to provide a code to enable automatic identification of the cartridge type or tape type. The second pattern of holes has a hexadecimal configuration.

In another embodiment, the invention is a method of identifying a cartridge type or tape type. The method includes loading a tape cartridge in a recorder, the cartridge having a magnetic tape. The magnetic tape is then advanced past a detector. The magnetic tape has a pattern of indicia having a hexadecimal configuration. The indicia is then detected to indicate the cartridge type or tape type.

DETAILED DESCRIPTION OF THE PREFERRED EMBODIMENTS

The magnetic tape cartridge of the present invention comprises a cartridge shell 10 defining an enclosure, a pair of reel hubs 12 and 13 supported within the enclosure for free rotation about spaced parallel axes and a length of magnetic tape 15 extending along a tape path within the enclosure and having its ends wound on each of the reel hubs 12 and 13.

Figure 1:
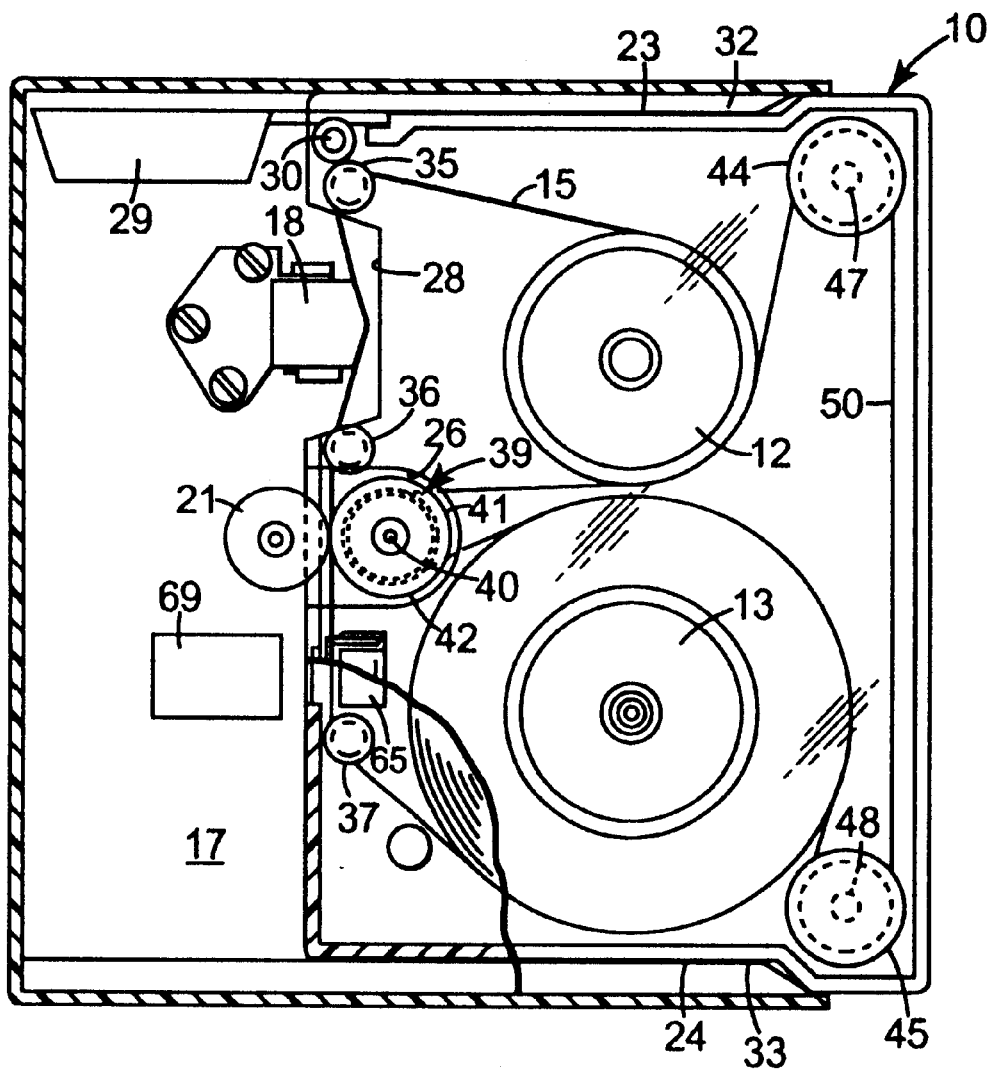
FIG. 1 is a plan view of a magnetic tape cartridge constructed in accordance with the present invention, partially in section and in position on a recording and/or reproducing machine.

In FIG. 1, the cartridge is shown in position in a recording and/or reproducing machine, hereinafter referred to as a tape recorder. The tape recorder comprises a support frame including a horizontal cartridge support deck 17 supporting a magnetic head 18 and, in a depending manner, supporting a reversible drive motor (not shown), the shaft of which extends through and carries a drive roller 21 above the support deck 17. Elongate guides 23 and 24 define the position for the cartridge on the cartridge support deck 17.

The cartridge shell 10 is formed with an opening 26 in its top wall and extending into one edge wall centrally of the length of the edge wall to provide access for the drive roller 21 of the tape recorder. The same edge wall of the cartridge shell is also formed with a cutaway portion 28 for access to the interior of the cartridge by the magnetic head 18. The cutaway portion 28 is normally covered by a door 29 which is pivoted on a stud 30 adjacent a corner of the cartridge and biased by a torsion spring toward its closed position covering the cutaway portion 28. The opposed edge walls 32 and 33 of the cartridge shell, which are perpendicular to the edge wall thereof containing the cutaway portion 28, are recessed along a majority of their length to expose the base wall, and the elongate guides 23 and 24 in the recorder are formed to fit over the exposed portion of the base wall of the cartridge shell to guide the cartridge as it is inserted into the recorder. The door 29 of the cartridge shell 10 extends beyond its pivot stud 30 into the recessed portion of the adjacent edge wall 32 and the leading edge of the corresponding cartridge guide 23 in the tape recorder is beveled to pivot the door 29 to an open position against the bias of the torsion spring as the cartridge is inserted into the machine.

The magnetic tape 15 is convolutely wound on the reel hubs 12 and 13 in opposite directions about their axes. The tape guide path between the reel hubs is defined by three guide pins 35, 36 and 37, one positioned at each side of the cutaway portion 28 of the cartridge shell 10 to guide the tape from the reel hub 12 and across the cutaway portion 28, and one pin positioned at the edge of the drive roller opening 26 farthest removed from the cutaway portion 28 to guide the tape to the reel hub 13.

A belt-driving roller 39 is supported for free rotation by a shaft 40 extending from the base wall of the cartridge shell 10. The belt driving roller 39 is rotatable about an axis parallel to the axes of the reels 12 and 13 and its is positioned on the centerline of the cartridge between the reel hubs. It is formed with a smaller diameter portion which has a central circumferential belt guide slot 41 in horizontal alignment with the center line of the tape guide path and a larger diameter portion 42 extending into the drive roller opening 26 in the cartridge shell 10. The larger diameter portion 42 of the belt driving roller 39 extends over the tape path between the guide pins 36 and 37 to permit driving of the belt driving roller 39 by the drive roller 21 in the tape recorder without contacting the tape 15.

A pair of belt guide rollers 44 and 45 are supported on the cartridge shell by stationary shafts 47 and 48, respectively, for rotation about axes parallel to the axis of the belt driving roller 39. The belt guide rollers 44 and 45 and their support shafts 47 and 48 are constructed of materials which have a predetermined coefficient of friction to provide a predetermined frictional coupling between each guide roller and its support shaft. The belt guide rollers are positioned at opposite corners of the cartridge shell 10 along the edge wall thereof parallel to the edge wall formed with the cutaway portion 28. Each belt guide roller is formed with a central circumferential belt guide slot in horizontal alignment with the guide slot 41 in the belt-driving roller 39. The belt driving roller 39 and the belt guide rollers 44 and 45 define a belt guide path having an angle of wrap of at least 60° at the periphery of the reel hubs 12 and 13.

A thin continuous, flexible and elastic belt 50 having a uniform cross-sectional area extends along the belt guide path around the belt driving roller 39 and the belt guide rollers 44 and 45 and contacts the tape 15 on the reel hubs 12 and 13. The belt 50 has a coefficient of elasticity in the range from 0.01 to 0.25 meters per newton meter. The length of the belt 50 is less than the length of the belt guide path so that when the belt is stretched into position along the guide path it will have an installed tension or pretension of at least 1.6 newtons.

Rotation of the belt driving roller 39 in the clockwise direction (as viewed in FIG. 1) by the drive roller 21 causes the belt 50 to traverse its guide path in a clockwise direction and the tape 15 to move from the reel hub 12 to the reel hub 13, the reel hub 12 serving as a supply reel and the reel hub 13 serving as a take-up reel. The predetermined frictional coupling between the belt guide rollers 44 and 45 and their respective support shafts 47 and 48 applies a predetermined drag to the belt as it passes around the guide rollers, thereby increasing the tension in the belt as it passes around each of the guide rollers. This increased tension in the belt 50 increases the length of the belt, according to the elasticity of the belt, thereby increasing the speed at which the belt passes around the take-up 13 over that at which it passes over the supply reel 12. This increased speed causes tension in the tape 15 as well as the ability to take up any slack developed in the tape between the reel hubs. Reversal of the direction of rotation of the belt driving roller 39 (i.e., counterclockwise as viewed in FIG. 1) will result in transfer of tape from reel hub 13 to reel hub 12 with the same tape drive properties.

The cartridge 10, described above is an example of one type of cartridge that may utilize the present invention. The hexadecimal coding on the tape 15, to be described hereafter, may be used with a wide variety of data cartridges.

Figure 2:
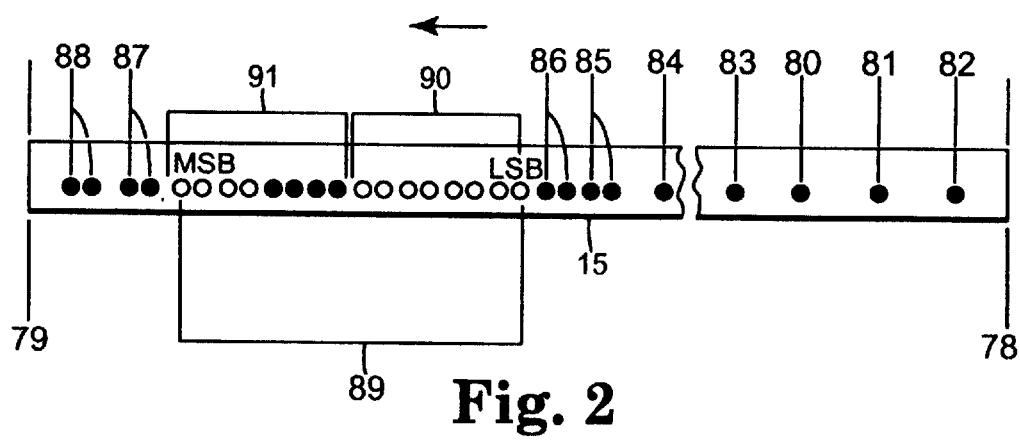
FIG. 2 is an elevational view of a first embodiment of a length of tape which may be contained within the cartridge of FIG. 1.
Figure 3:
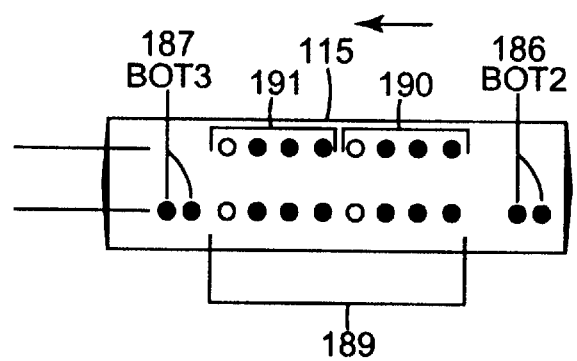
FIG. 3 is an elevational view of a second embodiment of a tape which may be contained within the cartridge of FIG. 1.
Figure 4:
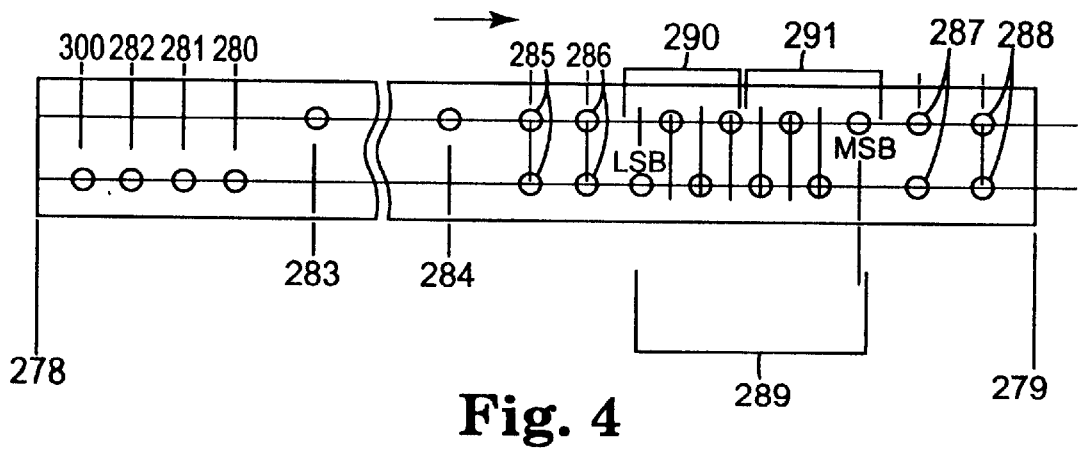
FIG. 4 is an elevational view of a third embodiment of a tape which may be contained within the cartridge of FIG. 1.

Referring to FIGS. 2 and 3, a black circle represents a hole created. Where there is an open circle, that is an indication of there being no holes. The logic circuit of the recorder will interpret this as not being a hole as is well know in the art. This is described in more detail in U.S. Pat. No. 4,863,114. The presence or absence of holes at a cell location within the pattern will be interpreted by the logic circuit as "1" or "0" to impart binary information to the logic circuit. In FIG. 4, the open circles represent holes. Hexadecimal describes a base-16 number system. That is, it describes a numbering system containing 16 sequential numbers as base units (including 0) before adding a new position for the next number. The hexadecimal numbers are 0–9 and then use the letters A–F. The present invention utilizes a two place number. The two place number comprising a least significant bit and a most significant bit. The number of possibilities for a two place number in a hexadecimal system is from 00-FF, or 256 combinations in base 10.

In FIG. 2, the forward direction of the tape travel is indicated by the arrow. The first end 78 of the tape is to the right and the second end 79 of the tape is at the left of FIG. 2. The end of tape (EOT) holes are indicated by holes 80–82 with 80 indicating EOT1; 81 indicating EOT2; and 82 indicating EOT3. Hole 83 represents an early warning hole and hole 84 represents a load point hole. The beginning of tape (BOT) holes are indicated by holes 85–88. Each of the holes 85–88 are pairs of holes and are used by the logic circuit to differentiate between the beginning of tape and end of tape, as is well know in the art. Holes 85 represent BOT1; 86 represents BOT2; 87 represents BOT3; and 88 represents BOT4. The tape 15, thus far described, is well in the art.

The cartridge identification holes are represented as the pattern of holes 89. The least significant bit is designated by the pattern of holes 90 and the most significant bit is represented by the pattern of holes 91. The cartridge identification holes are decoded least significant bit first with respect to the load point. The pattern of holes 90 includes four cells of information, as does the pattern of holes 91. Each cell consists of two circles or spaces. The circles or spaces are always in pairs. Since the cartridge, which utilizes the present invention, is the same as the cartridge of older generations of cartridges, the use of two holes together is used by the logic circuit to differentiate this new style cartridge from the old style cartridge. The pattern of holes 90 provides for the binary code of 0000, which equals zero. The pattern of holes 91, for the most significant digit, is 0011, which equals three in binary. (It is well known that the detector or recorder would read from right to left a 1,1,0,0, and then transpose this to 0011 or 3). Therefore, the cartridge ID represented by the pattern of holes 89 is 30 in hexadecimal. By using the hexadecimal configuration for the ID section, the tape is able to be more effectively used to design lower cost electronics and firmware for drive-end sensing and cartridge identification systems. The hexadecimal code is the basic byte element used by all computers and therefore by having the cartridge identification code in a hexadecimal configuration, it may more easily and effectively be used. Older versions of the data cartridge have their cartridge identification holes between holes 83 (BOT1) and 84 (BOT2). Further, the older versions only use six hole positions to achieve on octal configuration. The use of eight holes, four for each bit, provides for a hexadecimal "configuration. Since the four holes in binary represents 16 characters the cartridge identification 89 may utilized the hexadecimal configuration. Therefore there is no conversion, which is necessary when using the octal system of the prior art.

FIG. 3 shows a second embodiment of a tape 115 incorporating the present invention. The tape 115 represents a type of tape that is typically used in a TRAVAN™ style data cartridge. TRAVAN is a trademark of Imation Corporation. Only that portion of the tape 115 between BOT3 holes 187 and BOT2 holes 186 is shown. The cartridge ID holes 189 again are for the use in a hexadecimal configuration. The least significant bit is identified by holes 190 and the most significant bit is represented by holes 191. The pattern of holes 190 includes four cells of information. Each cell comprising two holes or spaces in vertical alignment. As shown in FIG. 3, the least significant bit is shown as 0111. (The recorder would read 1,1,1,0 and then transpose this to 0111). Similarly, the most significant bit has a pattern of holes which includes four cells of information. Again, this is represented in FIG. 3 as 0111. The hexadecimal cartridge ID would therefore be 77 as shown in FIG. 3.

Referring to FIG. 4, the forward direction of the tape traveled is to the right. The FIG. 4 shows the pattern for a 5 ¼ inch form factor data cartridge. The first end of the tape 278 is to the left and the second end 279 of the tape is at the right of FIG. 4. The end of tape holes are indicated by holes 280, 281, 282 and 300 with 280 representing EOT1; 281 representing EOT2; 282 indicating EOT3; and 300 representing EOT4. Hole 283 represents an early-warning hole and hole 284 represents a load point hole. The beginning of tape holes are indicated by holes 285 through 288. Each of the holes 285 through 288 are pairs of holes and are used by the logic circuit to differentiate between the beginning of the tape and the end of the tape, as is well known in the art. Hole 285 represents BOT1; 286 represents BOT2; 287 represents BOT3; and 288 represents BOT4. The cartridge identification holes are represented as hole patterns 289. The least significant bit is designated by the pattern of holes 290 and the most significant bit is represented by the pattern of holes 291. Pattern of holes 290 includes four cells of information as does the pattern of holes 291. In this embodiment, the cartridge identification holes always utilize a hole in either the top line of holes or the bottom line of holes. If a hole is present on the bottom line, it represents a 1 and if a hole is on the top line, it represents a 0. Therefore, the least significant bit, represented by hole patterns 290, represents 0101 in binary or 5. The pattern of holes 291 for the most significant bit also reads 0101 for a binary number of 5. The hexadecimal configuration is therefore 55. Again, the detector would read from left to right 1,0,1,0 and then transpose this to 0101 or 5.

The present invention has been described with respect to the use of holes to indicate either a 0 or 1 in a binary system. It is of course understood that other indicia may be utilized. For example, the tape could be a dark color tape with transparent areas or circles. The tape could also include indicia of reflective and non-reflective areas. Any number of indicia to indicate a difference between a 1 and a 0 may be utilized to differentiate between a 1 or a 0. It is envisioned that magnetic indicia may also be used and they in turn would be sensed by a magnetic sensing device. Further, while the cartridge has been described with respect to having two hubs, it is understood by one skilled in the art that one of the hubs could be positioned in the drive of the recorder and the drive could go in and grasp one end of the tape, as is well known in the art. Also, the tapes have been described as using beginning of tape holes and end of tape holes. This is necessary because the tape ends are not secured to the hubs and are simply wound around the hubs. If the detector did not have the beginning of tape holes or end of tape holes to sense the tape may be pulled off of the hubs. If the ends were secured to the hubs or reels, these holes would not be necessary.

I claim:

1. A magnetic tape cartridge comprising:
   a) a cartridge shell defining an enclosure;
   b) a pair of reel hubs supported within said enclosure;
   c) a length of magnetic tape extending along a tape path within said enclosure and the length of magnetic tape having opposite ends respectively wound one on each of said reel hubs;
   d) said length of tape being formed at a first end and a second end with a first pattern of holes to enable automatic identification of said end of said tape and the first pattern of holes defined by a first succession of cells each consisting of one hole at the first end of said tape and a second succession of cells each consisting of two or more closely associated holes arranged across the width of said tape on a line perpendicular to the length of said tape at the second end of said tape; and
   e) a second pattern of holes having a hexadecimal configuration located between the first succession of cells and the second succession of cells of said first pattern of holes and configured to provide a code to enable automatic identification of the cartridge type or tape type, the hexadecimal configuration having a least significant bit and a most significant bit.

2. The cartridge of claim 1, where the bits each have eight hole positions, each such bit identifying a 4 place binary number, whereby there are 256 identifications in total.

3. A magnetic tape cartridge comprising:
   a) a cartridge shell defining an enclosure;
   b) at least one reel hub supported within said enclosure;
   c) a length of magnetic tape extending along a tape path within said enclosure and the length of magnetic tape having one end wound on said reel hub; and
   d) a pattern of holes having a hexadecimal configuration located on the tape and configured to provide a code to enable automatic identification of the cartridge type or tape type, wherein the hole pattern is configured to represent a least significant bit and a most significant bit.

4. The cartridge of claim 3, further comprising a second reel hub, the magnetic tape having another end wound on said second reel hub.

5. The cartridge of claim 3, further comprising said length of tape being formed at each end with a second pattern of holes to enable automatic identification of said end of said tape and defined by a succession of cells each consisting of one hole at one end of said tape and a succession of cells each consisting of two or more closely associated holes arranged across the width of said tape on a line perpendicular to the length of said tape at the other end of said tape.

6. The cartridge of claim 3, where the bits each have eight hole positions, and each identifying a 4 place binary number and therefore 256 identifications in total.

7. A method of identifying a cartridge type or tape type comprising:
   a) loading a tape cartridge in a recorder, the cartridge having a magnetic tape;
   b) advancing the magnetic tape past a detector, the magnetic tape having a pattern of holes having a hexadecimal configuration, the hexadecimal configuration having a least significant bit and a most significant bit; and
   c) detecting the hole pattern to the cartridge type or tape type.

8. The method of claim 7, further comprising detecting a second pattern of holes to enable automatic identification of ends of said tape and the second pattern of holes defined by a first succession of cells each consisting of one hole at a first end of said tape and a second succession of cells each consisting of two or more closely associated holes arranged across the width of said tape on a line perpendicular to the length of said tape at a second end of said tape.

* * * * *

UNITED STATES PATENT AND TRADEMARK OFFICE
CERTIFICATE OF CORRECTION

PATENT NO.    : 6,305,630 B1                                           Page 1 of 1
DATED         : October 23, 2001
INVENTOR(S)   : Danny J. Argento It is certified that error appears in the above-identified patent and that said Letters Patent is hereby corrected as shown below:

Column 6,
Line 56, "to the cartridge" should read -- to indicate the cartridge --.

Signed and Sealed this

Twenty-ninth Day of October, 2002

Attest:

Attesting Officer

JAMES E. ROGAN
Director of the United States Patent and Trademark Office